US012759566B2

(12) United States Patent
Chang et al.

(10) Patent No.: US 12,759,566 B2
(45) Date of Patent: Oct. 13, 2026

(54) METHOD AND SYSTEM FOR STABILIZING MOVEMENT OF VEHICLE

(71) Applicant: Automotive Research & Testing Center, Lugong (TW)

(72) Inventors: Yen-Hsiang Chang, Lugong (TW); Tsung-Hua Hsu, Lugong (TW); Jia-Le Wei, Lugong (TW)

(73) Assignee: AUTOMOTIVE RESEARCH & TESTING CENTER, Changhua County (TW)

( * ) Notice: Subject to any disclaimer, the term of this patent is extended or adjusted under 35 U.S.C. 154(b) by 52 days.

(21) Appl. No.: 18/965,583

(22) Filed: Dec. 2, 2024

(65) Prior Publication Data

US 2026/0152191 A1 Jun. 4, 2026

(51) Int. Cl.
*B60W 50/00* (2006.01)
*B60W 30/02* (2012.01)

(52) U.S. Cl.
CPC ........ *B60W 50/0098* (2013.01); *B60W 30/02* (2013.01); *B60W 50/0097* (2013.01)

(58) Field of Classification Search
None
See application file for complete search history.

(56) References Cited

U.S. PATENT DOCUMENTS 10,899,360 B2 1/2021 Moran et al.
2006/0149445 A1* 7/2006 Suzumura ............ B60T 8/1755 701/41
2014/0032049 A1* 1/2014 Moshchuk ............ G08G 1/166 701/42
2017/0291638 A1* 10/2017 Gupta .................. B62D 15/025
2021/0101588 A1* 4/2021 Pontisakos ...... B60W 30/18154

FOREIGN PATENT DOCUMENTS

| | | | |
|---|---|---|---|
| CN | 106976451 | A | 7/2017 |
| CN | 116080754 | A | 5/2023 |
| CN | 116442997 | A | 7/2023 |
| CN | 117584953 | A | 2/2024 |
| TW | I453697 | B | 9/2014 |
| TW | I535601 | B | 6/2016 |
| TW | I645998 | B | 1/2019 |
| TW | I674984 | B | 10/2019 |
| TW | I689433 | B | 4/2020 |
| TW | 202112591 | A | 4/2021 |
| TW | I824773 | B | 12/2023 |

* cited by examiner

*Primary Examiner* — Navid Z. Mehdizadeh
*Assistant Examiner* — Jason R Roberson
(74) *Attorney, Agent, or Firm* — Birch, Stewart, Kolasch & Birch, LLP

(57) ABSTRACT

A method for stabilizing movement of a vehicle is to be implemented by a processor. The vehicle includes a plurality of wheels, and the method includes steps of: A) obtaining a set of vehicle data related to the vehicle; B) determining whether a path on which the vehicle is driving is a dangerous path based on the set of vehicle data; C) in response to determining that the path is a dangerous path, obtaining a compensation steering angle; D) obtaining a target steering angle based on an estimated steering wheel angle and the compensation steering angle; E) based on the target steering angle, selecting one of the wheels of the vehicle as a first target wheel and obtaining a first control command corresponding to the first target wheel; and F) outputting the first control command for controlling the first target wheel.

14 Claims, 7 Drawing Sheets

METHOD AND SYSTEM FOR STABILIZING MOVEMENT OF VEHICLE

FIELD

The disclosure relates to a method for stabilizing movement of a vehicle and a system for implementing the same, and more particularly to a method for stabilizing movement of a vehicle and providing risk assessment for a path of the vehicle, and a system for implementing the same.

BACKGROUND

A conventional electronic stability control (ESC) system is an active safety system for controlling the steering stability of a vehicle. The conventional ESC system uses sensors to monitor a posture of the vehicle, and operations of a steering wheel, a throttle and a brake of the vehicle. When the conventional ESC system determines that the vehicle may become unstable (e.g., right after a sudden avoidance for an obstacle or when changing lanes while driving at a high speed), the conventional ESC system controls a braking force or a driving force applied on one wheel of the vehicle to stabilize the vehicle.

SUMMARY

Therefore, an object of the disclosure is to provide a method and a system for stabilizing a movement of a vehicle and providing risk assessment for a path of the vehicle that can alleviate at least one of the drawbacks of the prior art.

According to an aspect of the disclosure, a method for stabilizing movement of a vehicle is to be implemented by a processor. The vehicle includes a plurality of wheels, and the method includes steps of: A) obtaining a set of vehicle data related to the vehicle; B) determining whether a path on which the vehicle is driving is a dangerous path based on the set of vehicle data; C) in response to determining that the path is a dangerous path, obtaining a compensation steering angle; D) obtaining a target steering angle based on an estimated steering wheel angle and the compensation steering angle; E) based on the target steering angle, selecting one of the wheels of the vehicle as a first target wheel and obtaining a first control command corresponding to the first target wheel; and F) outputting the first control command for controlling the first target wheel.

According to another aspect of the disclosure, a system for stabilizing movement of a vehicle that includes a plurality of wheels is provided. The system includes a processor that is configured to obtain a set of vehicle data related to the vehicle, and to determine whether a path on which the vehicle is driving is a dangerous path based on the set of vehicle data. The processor is further configured to, in response to determining that the path is a dangerous path, obtain a compensation steering angle, and to obtain a target steering angle based on an estimated steering wheel angle and the compensation steering angle. The processor is further configured to, based on the target steering angle, select one of the plurality of wheels of the vehicle as a first target wheel and obtain a first control command corresponding to the first target wheel, and output the first control command for controlling the first target wheel.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
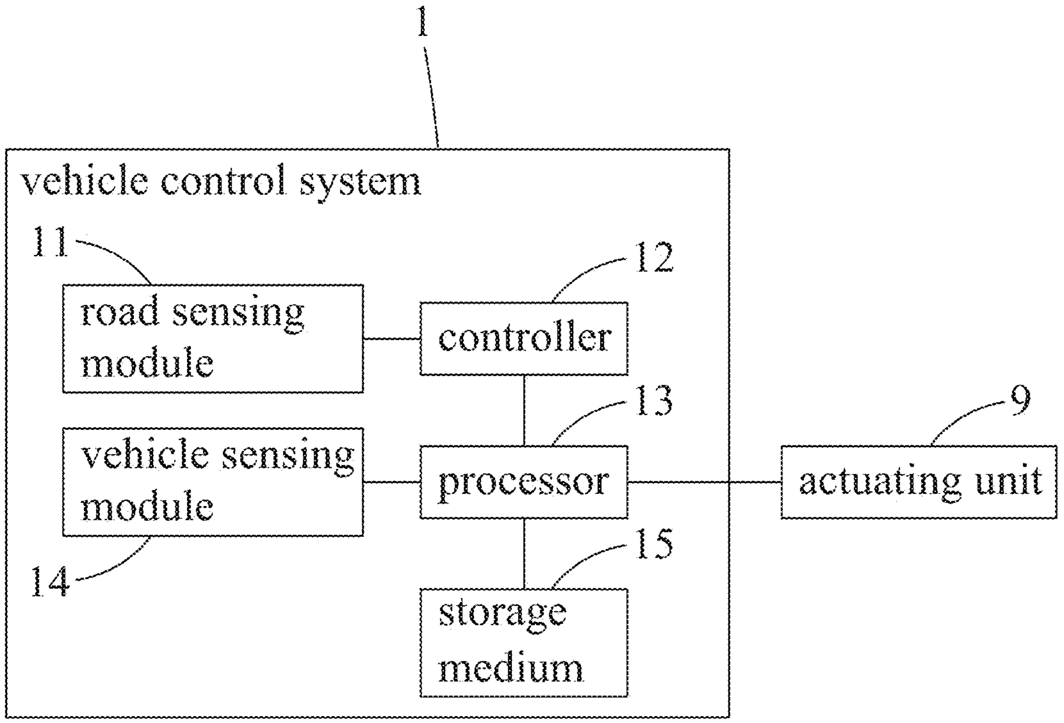
FIG. 1 is a block diagram illustrating a vehicle control system according to an embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIG. 1, according to an embodiment of the disclosure, a method for stabilizing movement of a vehicle is implemented on a vehicle by a vehicle control system 1. The vehicle includes a plurality of wheels (not shown), and an actuating unit 9 that may be an engine, a motor, or a set of brakes respectively for the wheels of the vehicle. The vehicle control system 1 includes a road sensing module 11, a controller 12, a processor 13, a vehicle sensing module 14 and a storage medium 15, where the road sensing module 11 is electrically connected to the controller 12, and the processor 13 is electrically connected to the controller 12, the vehicle sensing module 14 and the storage medium 15. Specifically, the processor 13, the vehicle sensing module 14 and the storage medium 15 of the vehicle control system 1 are components of an electronic stability control (ESC) system. The processor 13 is further electrically connected to the actuating unit 9 of the vehicle for controlling the wheels of the vehicle.

The road sensing module 11 is configured to detect a road on which the vehicle is driving and at least one obstacle on the road, so as to generate road condition data. In this embodiment, the road sensing module 11 includes at least one of an optical radar, an ultrasonic radar, a millimeter wave radar or a camera array.

The controller 12 is configured to, based on the road condition data, generate at least one obstacle dataset corresponding respectively to the at least one obstacle, and generate driving path data related to an estimated path on which the vehicle will drive at a next time point. Each obstacle dataset includes an obstacle location, an obstacle velocity and an obstacle acceleration of the respective obstacle relative to the vehicle. For further details of generating the at least one obstacle dataset, reference may be made to Taiwanese Invention Patent No. I453697 titled "Detection System of Driving Space and Its Detection Method," and Taiwanese Invention Patent No. I535601 titled "Sliding Mode of Trajectory Voting Strategy Module of Driving Control System and Method." The driving path data includes an estimated lateral displacement, an estimated lateral speed, an estimated yaw angle error, an estimated yaw rate, and an estimated steering wheel angle. For further details of generating the driving path data, reference may be made to Taiwanese Invention Patent No. I689433 titled "Lane Tracking Method and System for Autonomous Driving Vehicles."

In addition to controlling stability of the vehicle, the ESC system further provides a risk assessment function and a steering support service. In this embodiment, the controller 12 and the processor 13 each may be an electronic control unit (ECU), or may be combined and collectively implemented by an ECU.

The vehicle sensing module 14 is configured to detect the vehicle so as to generate vehicle sensing data, and includes at least one of a vehicle posture sensor (e.g., a gyroscope), a steering wheel sensor that measures a steering angle and a torque of a steering wheel of the vehicle, a wheel speed sensor, or a pressure sensor that measures pressures of a master cylinder and a slave cylinder. The vehicle sensing data includes a time to collision, a vehicle speed of the vehicle, an acceleration value of the vehicle, an actual longitudinal speed of the vehicle, an actual rate of change of lateral displacement of the vehicle, an actual rate of change of lateral speed of the vehicle, an actual yaw rate related to a yaw angle error of the vehicle, a real yaw rate of the vehicle, an actual rate of change of yaw rate of the vehicle, and a steering wheel torque of the vehicle. It should be noted that the time to collision for the vehicle depends on a model of the vehicle, and for reference to the concept of time to collision, see International Standard ISO15623.

A road frictional coefficient, the vehicle sensing data, vehicle status data of the vehicle, a plurality of obstacle distances corresponding respectively to a plurality of directions relative to the vehicle, an understeering determination result and an oversteering determination result are collectively referred to as a set of vehicle data. The road frictional coefficient may be obtained by an anti-lock braking system (ABS) (not shown) of the vehicle, and reference may be made to Taiwanese Invention Patent No. I718672 titled "Method for Controlling Brake According to Friction Characteristics of Pavement Calculating a Real-time Wheel Speed Value According to a Wheel Rotating Speed Signal." The vehicle status data is obtained from an original manufacturer of the vehicle, and includes a performance weight value related to braking performance of the vehicle, a vehicle weight of the vehicle, a first lateral stiffness of front wheels of the vehicle, a second lateral stiffness of rear wheels of the vehicle, a moment of inertia of the vehicle, a first distance between a front axle of the vehicle and a center of gravity of the vehicle, a second distance between a rear axle of the vehicle and the center of gravity of the vehicle, a wheelbase of the vehicle, a first gain related to a frictional coefficient of the wheels of the vehicle, a target slip coefficient of the wheels of the vehicle, a second gain related to the target slip coefficient of the wheels of the vehicle, and a normal force on the wheels of the vehicle. The obstacle distances are obtained by the processor 13 based on the at least one obstacle dataset. The understeering determination result and the oversteering determination result are obtained by the processor 13 using equation 1 as follows:

$$\begin{cases} \text{when } \frac{mb}{LC_{\alpha f}} - \frac{mb}{LC_{\alpha r}} > 0, \text{ understeering determination result is positive} \\ \text{when } \frac{mb}{LC_{\alpha f}} - \frac{mb}{LC_{\alpha r}} > 0, \text{ oversteering determination result is positive} \end{cases}, \quad \text{(eq. 1)}$$

where m represents the vehicle weight, a represents the first distance, b represents the second distance, L represents the wheelbase, $C_{\alpha f}$ represents the first lateral stiffness, and $C_{\alpha r}$ represents the second lateral stiffness. It should be noted that different vehicle models may have different braking distances when driving at the same speed, and the performance weight value is related to a braking distance of the vehicle. Specifically, the higher the performance weight value, the shorter the braking distance, and vice versa.

The storage medium 15 is configured to store the road frictional coefficient, the vehicle status data, and a safety-distance estimation model that is configured to obtain an output safety distance based on an input time to collision, an input vehicle speed, an input performance weight value and an input acceleration value. In this embodiment, the safety-distance estimation model is a time to collision model, and is obtained using a machine learning algorithm based on a plurality of training datasets. Each of the training datasets includes a training time to collision, a training vehicle speed, a training performance weight value, a training acceleration value and a training safety distance. For each of the training datasets, each of the training time to collision, the training vehicle speed, the training performance weight value and the training acceleration value may be set to different values to simulate different scenarios, and the training safety distance that corresponds to each scenario is obtained through experiment.

Figure 2:
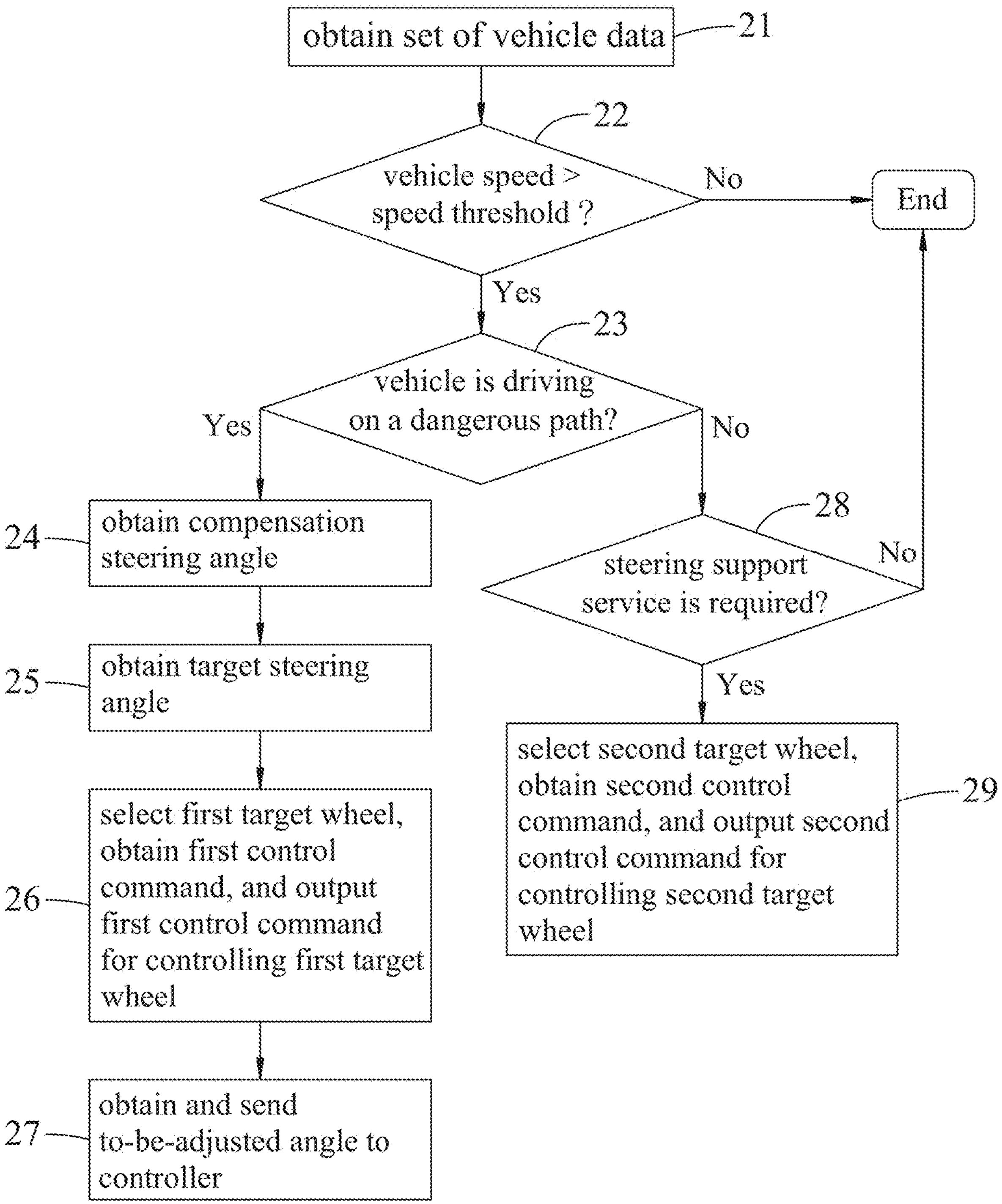
FIG. 2 is a flow chart of a method for stabilizing movement of a vehicle according to an embodiment of the disclosure.

Referring further to FIG. 2, the method for stabilizing movement of the vehicle according to an embodiment of the disclosure includes steps 21 to 29.

In step 21, the processor 13 obtains the set of vehicle data related to the vehicle. Specifically, the vehicle sensing data is obtained from the vehicle sensing module 14, the vehicle status data and the road frictional coefficient are obtained from the storage medium 15, the obstacle distances are obtained based on the at least one obstacle dataset that is received from the controller 12, and the understeering determination result and the oversteering determination result are obtained by the processor 13 through calculation. It should be noted that the order of obtaining each pieces of data in the set of vehicle data is not restricted to the abovementioned listed order as long as necessary information for obtaining a specific piece of data has already been obtained.

In step 22, the processor 13 determines whether the vehicle speed is greater than a speed threshold (e.g., is greater than 8.3 m/s or 30 km/hr). When the processor 13 determines that the vehicle speed is greater than the speed threshold, the flow of the method proceeds to step 23; otherwise, the flow of the method ends.

In step 23, the processor 13 determines whether a path on which the vehicle is driving is a dangerous path based on the set of vehicle data. When the processor 13 determines that the vehicle is driving on a dangerous path, the flow proceeds to step 24; otherwise, the flow proceeds to step 28.

Figure 3:
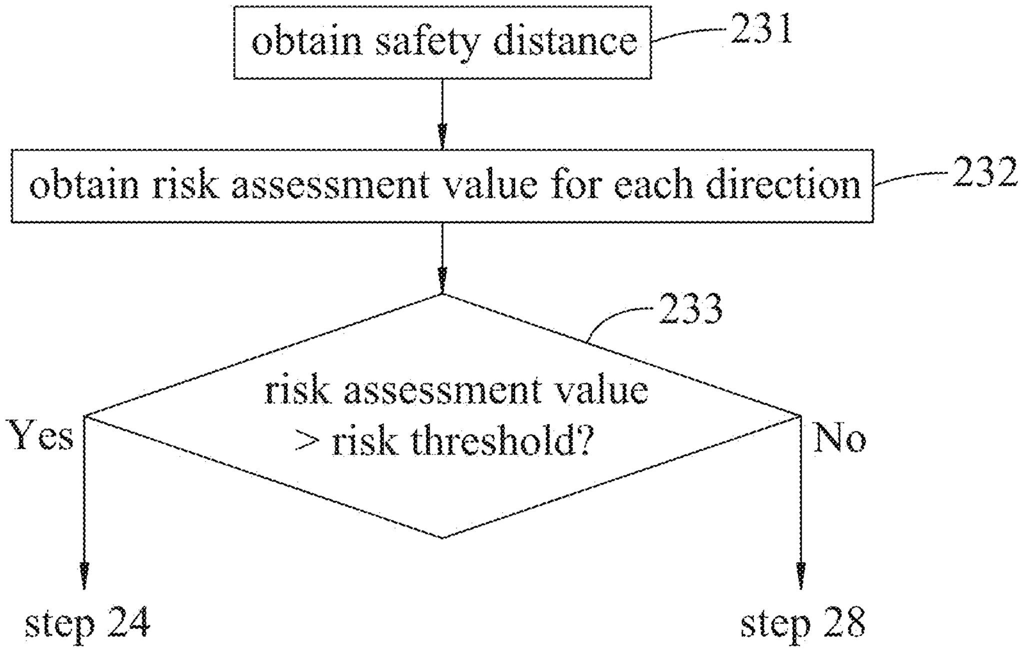
FIG. 3 is a flow chart illustrating steps for determining whether a vehicle is driving on a dangerous path.

To describe in further detail, step 23 includes sub-steps 231 to 233 (see FIG. 3). In sub-step 231, the processor 13 obtains a safety distance, using the safety-distance estimation model, based on the time to collision, the vehicle speed, the performance weight value and the acceleration value included in the set of vehicle data. In this embodiment, the safety distance is obtained using the safety-distance estimation model, but in some embodiments, the safety distance may be obtained by multiplying the time to collision and the vehicle speed directly.

In sub-step 232, the processor 13 obtains, for each of the directions relative to the vehicle, a collision risk assessment value corresponding to the direction based on the safety distance and one of the obstacle distances that corresponds to the direction. In this embodiment, the processor 13 first obtains a risk rate using equation 2 as follows:

$$\text{risk rate} = \frac{d_{safe} - d_{ob}}{d_{ob}}, \quad \text{(eq. 2)}$$

where $d_{safe}$ represents the safety distance, and $d_{ob}$ represents the obstacle distance corresponding to the direction. Then, the processor 13 obtains the collision risk assessment value based on the risk rate. It should be noted that, when the risk rate is less than or equal to zero, the collision risk assessment value is considered as zero. When the risk rate is greater than zero, the collision risk assessment value is equal to the risk rate.

In sub-step 233, the processor 13 determines, for one of the directions that corresponds to the path (i.e., a direction in which the vehicle is driving if the vehicle remains on the path), whether the collision risk assessment value that corresponds to the one of the directions is greater than a risk threshold value that corresponds to the one of the directions, so as to determine whether the path is a dangerous path. When the processor 13 determines that the collision risk assessment value that corresponds to the one of the directions is greater than the risk threshold value that corresponds to the one of the directions, the processor 13 determines that the path on which the vehicle is driving is a dangerous path; otherwise, the processor 13 determines that the path on which the vehicle is driving is not a dangerous path. In one example, the collision risk assessment value may range from one to ten, and the risk threshold value for each of the directions may be set to a different value. Assuming that the risk threshold value that corresponds to a front direction of the vehicle is set to eight, when the collision risk assessment value that corresponds to the front direction of the vehicle is greater than eight (e.g., is equal to nine), the processor 13 determines that the path on which the vehicle is driving is a dangerous path.

Figure 4:
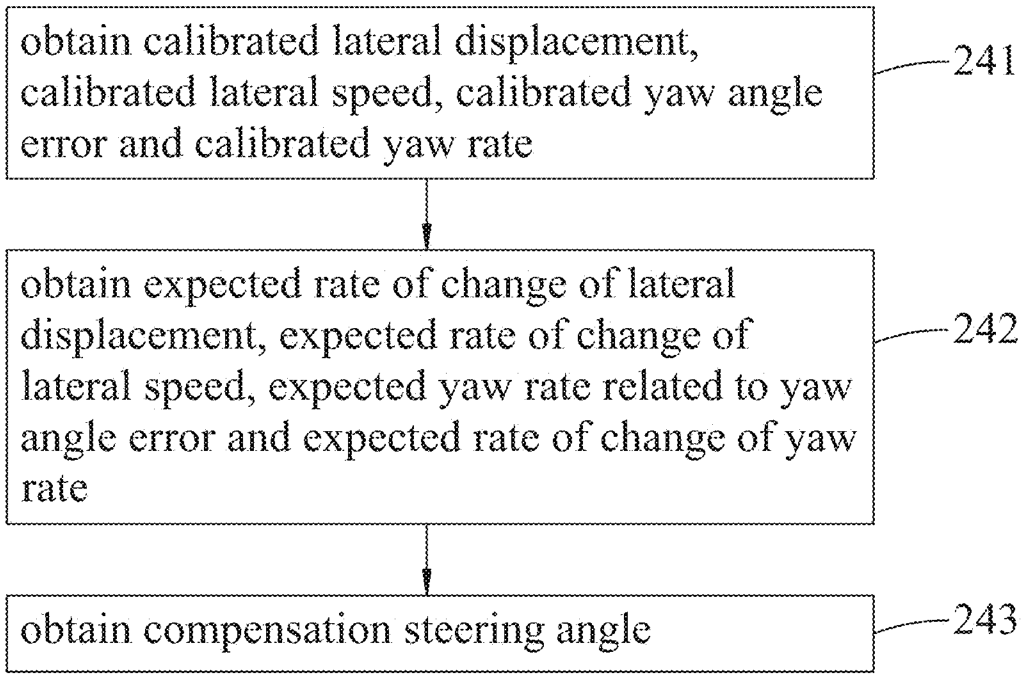
FIG. 4 is a flow chart illustrating steps for obtaining a compensation steering angle.

In step 24, the processor 13 obtains a compensation steering angle. To describe in further detail, step 24 includes sub-steps 241 to 243 (see FIG. 4).

In sub-step 241, the processor 13 obtains a calibrated lateral displacement, a calibrated lateral speed, a calibrated yaw angle error and a calibrated yaw rate based on the estimated lateral displacement, the estimated lateral speed, the estimated yaw angle error and the estimated yaw rate that are obtained from the controller 12, and the collision risk assessment values that correspond respectively to the directions relative to the vehicle. For further details of obtaining the calibrated lateral displacement, the calibrated lateral speed, the calibrated yaw angle error and the calibrated yaw rate, reference may be made to Taiwanese Invention Patent No. I824773 titled "Self-driving Route Planning System and Method," Taiwanese Invention Patent No. I674984 titled "Driving Track Planning System and Method for Self-driving Vehicles," and Taiwanese Invention Patent No. I645998 titled "Transformation Lane Decision and Trajectory Planning Method."

In sub-step 242, the processor 13 obtains an expected rate of change of lateral displacement, an expected rate of change of lateral speed, an expected yaw rate related to a yaw angle error and an expected rate of change of yaw rate based on the vehicle weight, the first lateral stiffness, the second lateral stiffness, the moment of inertia, the first distance, the second distance, the actual longitudinal speed, the calibrated lateral displacement, the calibrated lateral speed, the calibrated yaw angle error, the calibrated yaw rate and the estimated steering wheel angle. Specifically, the processor 13 obtains the expected rate of change of lateral displacement, the expected rate of change of lateral speed, the expected yaw rate related to a yaw angle error and the expected rate of change of yaw rate using equation 3 as follows:

$$\begin{bmatrix} \dot{y} \\ \dot{V}_y \\ \dot{\psi} \\ \dot{r} \end{bmatrix} = \begin{bmatrix} 0 & 1 & V_x & 0 \\ 0 & \frac{-(C_{\alpha f} + C_{\alpha r})}{mV_x} & 0 & \frac{bC_{\alpha r} - aC_{\alpha f}}{mV_x} - V_x \\ 0 & 0 & 0 & 1 \\ 0 & \frac{bC_{\alpha r} - aC_{\alpha f}}{I_z V_x} & 0 & \frac{-(a^2 C_{\alpha f} + b^2 C_{\alpha r})}{I_z V_x} \end{bmatrix} \begin{bmatrix} y \\ V_y \\ \psi \\ r \end{bmatrix} + \begin{bmatrix} 0 \\ \frac{C_{\alpha f}}{m} \\ 0 \\ \frac{aC_{\alpha f}}{I_z} \end{bmatrix} \delta_f, \quad \text{(eq. 3)}$$

where $\dot{y}$ represents the expected rate of change of lateral displacement, $\dot{V}_y$ represents the expected rate of change of lateral speed, $\dot{\psi}$ represents the expected yaw rate related to a yaw angle error, $\dot{r}$ represents the expected rate of change of yaw rate, m represents the vehicle weight, $C_{\alpha f}$ represents the first lateral stiffness, $C_{\alpha r}$ represents the second lateral stiffness, $I_z$ represents the moment of inertia, a represents the first distance, b represents the second distance, $V_x$ represents the actual longitudinal speed, y represents the calibrated lateral displacement, $V_y$ represents the calibrated lateral speed, $\psi$ represents the calibrated yaw angle error, r represents the calibrated yaw rate, and $\delta_f$ represents the estimated steering wheel angle.

In sub-step 243, the processor 13 obtains the compensation steering angle, using an angle conversion control method (e.g., one of feed-forward control, optimal control and proportional-integral-derivative control), based on the expected rate of change of lateral displacement, the expected rate of change of lateral speed, the expected yaw rate related to a yaw angle error, the expected rate of change of yaw rate, the actual rate of change of lateral displacement, the actual rate of change of lateral speed, the actual yaw rate related to a yaw angle error and the actual rate of change of yaw rate. It should be noted that enhanced learning in machine learning may use either a model-based algorithm or a model-free algorithm. In this embodiment, equation 3 is a road following model, which employs a model-based algorithm, but the disclosure is not limited to using the road following model. The disclosure may use any model employing either a model-based algorithm or a model-free algorithm to obtain parameters necessary for obtaining the compensation steering angle. In one example, the disclosure may use a constant acceleration (CA) model that employs a model-free algorithm to obtain a driving path of the vehicle, and the processor 13 may obtain the compensation steering angle using the angle conversion control method based on the abovementioned related parameters.

In step 25, the processor 13 obtains a target steering angle based on the estimated steering wheel angle that is obtained by the controller 12 and the compensation steering angle. Specifically, the target steering angle is a sum of the estimated steering wheel angle and the compensation steering angle.

In step 26, the processor 13 selects at least one of the wheels of the vehicle as a first target wheel based on the target steering angle, obtains a first control command corresponding to the first target wheel, and outputs the first control command to the actuating unit 9 for controlling the first target wheel. It should be noted that the first control command may be related to controlling an engine speed of a gas-powered vehicle, a motor speed of an electric vehicle, a braking force of a brake of a wheel for a gas-powered vehicle, or a braking force of a brake of a wheel for an electric vehicle, and the first control command is outputted to the actuating unit 9 (i.e., the engine, the motor, or one of the set of brakes) for controlling the first target wheel. In this embodiment, the first control command in steps 21 to 29 is exemplarily related to controlling a braking force of a brake of a wheel for a gas-powered vehicle. In some embodiments, when the vehicle is an electric vehicle or a 4-wheel drive gas-powered vehicle, the processor 13 selects one of the wheels of the vehicle as the first target wheel. In some embodiments, when the vehicle is an electric vehicle, a 4-wheel drive gas-powered vehicle, a front wheel drive gas-powered vehicle, or a rear wheel drive gas-powered vehicle, the processor 13 selects at least one of the wheels of the vehicle as the first target wheel.

Figure 5:
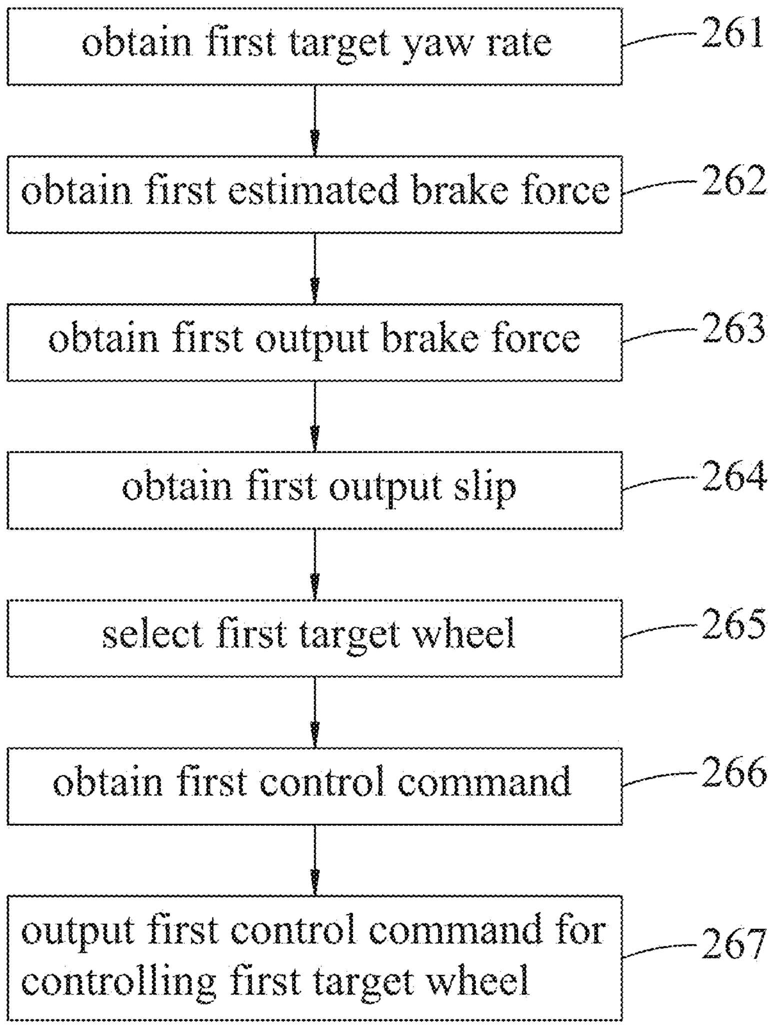
FIG. 5 is a flow chart illustrating steps for selecting a first target wheel and obtaining a first control command corresponding to the first target wheel.

In this embodiment, the processor 13 selects one of the wheels of the vehicle as the first target wheel. To describe in further detail, step 26 includes sub-steps 261 to 267 (see FIG. 5).

Figure 7:
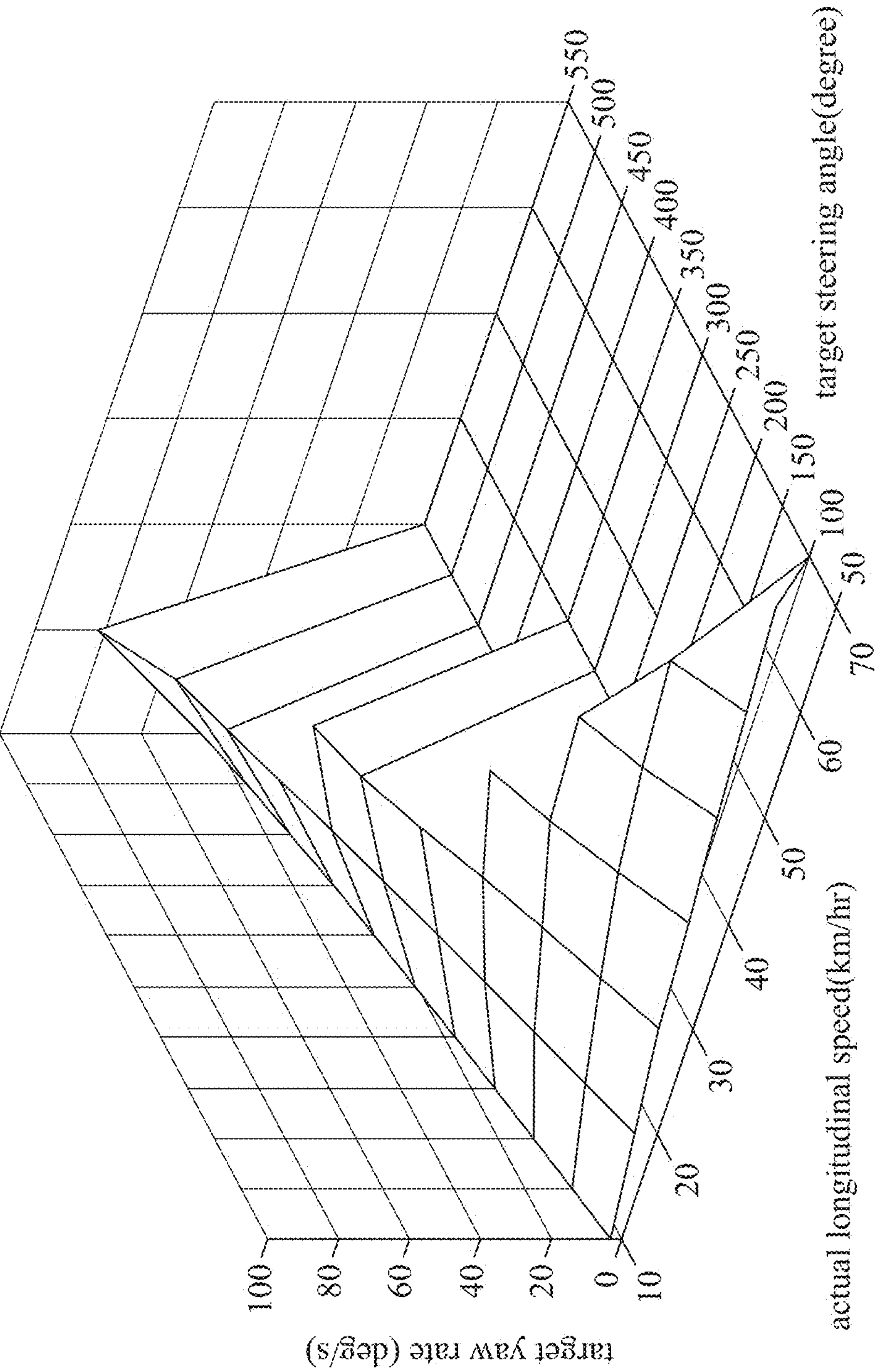
FIG. 7 is a three-dimensional grid plot illustrating a yaw rate transition function.

In sub-step 261, the processor 13 obtains a first target yaw rate based on the target steering angle and the actual longitudinal speed using a yaw rate transition function. It should be noted that the yaw rate transition function is obtained in advance by collecting data through experiment, and FIG. 7 shows an example of the yaw rate transition function.

In sub-step 262, the processor 13 obtains a first estimated brake force based on the first target yaw rate and the real yaw rate using equation 4 as follows:

$$\Delta F(t) = K_p(r_{desired} - r_{real}) + K_d\frac{d}{dt}(r_{desired} - r_{real}) + K_I\int(r_{desired} - r_{real})dt, \quad \text{(eq. 4)}$$

where ΔF represents the first estimated brake force, $r_{desired}$ represents the first target yaw rate, and $r_{real}$ represents the real yaw rate. It should be noted that $K_p$, $K_d$, and $K_I$ are coefficients obtained through experiment.

In sub-step 263, the processor 13 obtains a first output brake force based on the first estimated brake force, the first gain, the normal force and the road frictional coefficient using equation 5 as follows:

$$\Delta F_{cmd} = \min(|\Delta F(t)|, A \times \mu^* \times F_Z), \quad \text{(eq. 5)}$$

where $\Delta F_{cmd}$ represents the first output brake force, ΔF represents the first estimated brake force, A represents the first gain, $F_Z$ represents the normal force, and $\mu^*$ represents the road frictional coefficient.

In sub-step 264, the processor 13 obtains a first output slip based on the first output brake force, the target slip coefficient, the second gain, the road frictional coefficient and the normal force using equation 6 as follows:

$$\lambda_{cmd} = \min\left(\lambda^*, \frac{\lambda^*}{B}\ln\left(\frac{\mu^* \times F_Z}{\mu^* \times F_Z - \Delta F_{cmd}}\right)\right), \quad \text{(eq. 6)}$$

where $\Delta_{cmd}$ represents the first output slip, $\Delta F_{cmd}$ represents the first output brake force, $\lambda^*$ represents the target slip coefficient, B represents the second gain, $\mu^*$ represents the road frictional coefficient, and $F_Z$ represents the normal force.

In sub-step 265, the processor 13 selects the first target wheel based on the first target yaw rate and the real yaw rate according to Table 1 as below.

TABLE 1

| | $r_{desired} - r_{real} < 0$ | $r_{desired} - r_{real} \geq 0$ |
|---|---|---|
| $\lvert r_{desired}\rvert - \lvert r_{real}\rvert \geq 0$ | first target wheel being rear-right wheel | first target wheel being rear-left wheel |
| $\lvert r_{desired}\rvert - \lvert r_{real}\rvert < 0$ | first target wheel being front-right wheel | first target wheel being front-left wheel |

In sub-step 266, the processor 13 obtains the first control command corresponding to the first target wheel based on the first output slip using, for example, proportional-integral-derivative control.

In sub-step 267, the processor 13 outputs the first control command to, for example, a brake of the first target wheel for controlling the first target wheel.

In step 27, the processor 13 obtains a to-be-adjusted angle based on the target steering angle and a result of step 26 (i.e., an actual steering angle of the vehicle after step 26 is performed), and sends the to-be-adjusted angle to the controller 12 so that the controller 12 may control the vehicle based on the to-be-adjusted angle to compensate for the insufficient steering. That is to say, when the actual steering angle of the vehicle after step 26 is insufficient (i.e., the actual steering angle does not reach the target steering angle), the controller 12 receives the to-be-adjusted angle from the processor 13, and then controls the vehicle in such a manner that the vehicle completes steering to the target steering angle. Specifically, the actual steering angle is obtained by the vehicle posture sensor first obtaining a controlled yaw rate of the vehicle after step 26 is performed, and then the processor 13 integrates the controlled yaw rate over time so as to obtain the actual steering angle of the vehicle after step 26. It should be noted that the method of the controller 12 controlling the vehicle to compensate for the insufficient steering based on the to-be-adjusted angle is not the emphasis of the disclosure, and will not be described in further detail for the sake of brevity.

When the processor 13 determines that the vehicle is not driving on a dangerous path in step 23, the flow proceeds to step 28, where the processor 13 determines whether a steering support service is required. When the determination in step 28 is affirmative, the flow proceeds to step 29; otherwise, the flow of the method ends. In this embodiment, the processor 13 determines whether the steering support service is required by determining: 1) whether the steering wheel torque is greater than a torque threshold value, 2) whether the understeering determination result indicates understeering (i.e., whether the understeering determination result is positive), and 3) whether the oversteering determination result indicates oversteering (i.e., whether the oversteering determination result is positive). When any one of the three aforementioned determinations is affirmative, the processor 13 determines that the steering support service is required; otherwise, when all three aforementioned determinations are negative, the processor 13 determines that the steering support service is not required.

Figure 6:
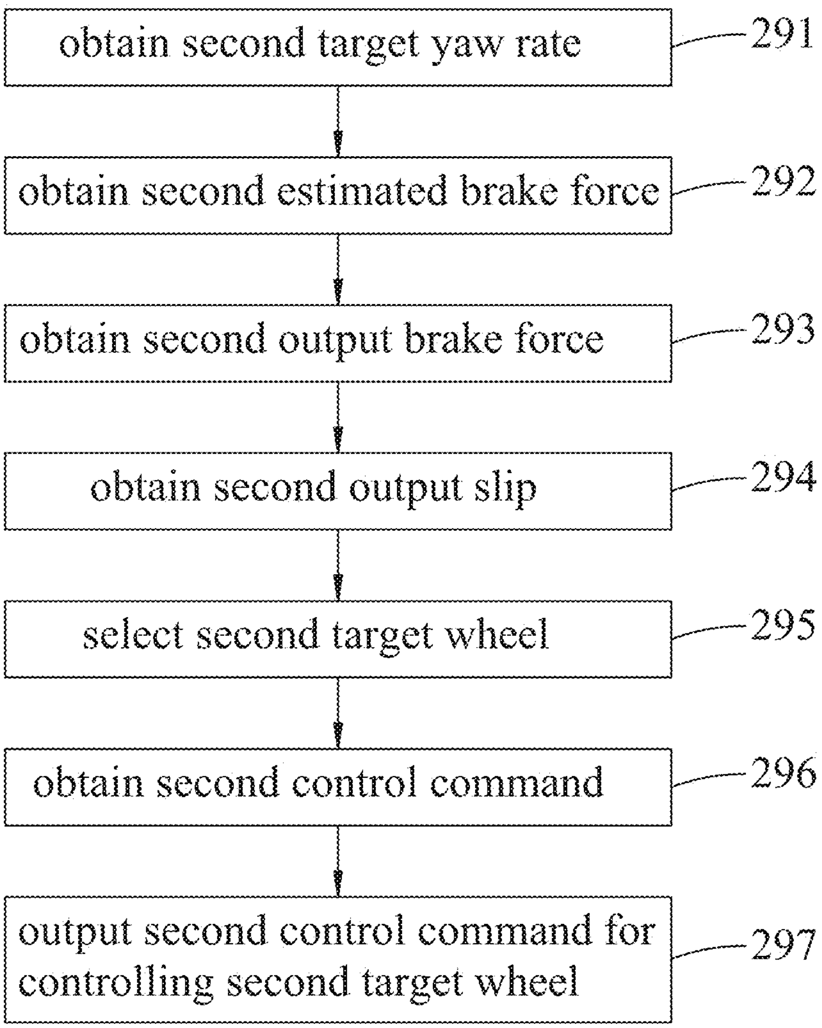
FIG. 6 is a flow chart illustrating steps for selecting a second target wheel and obtaining a second control command corresponding to the second target wheel.

In step 29, the processor 13 selects one of the wheels of the vehicle as a second target wheel, obtains a second control command corresponding to the second target wheel, and outputs the second control command for controlling the second target wheel so as to support the vehicle in stabilization (i.e., to perform the steering support service). In this embodiment, the second control command functions in a manner similar to the first control command. To describe in further detail, step 29 includes sub-steps 291 to 297 (see FIG. 6).

In sub-step 291, the processor 13 obtains a second target yaw rate based on the target steering angle and the actual longitudinal speed using another yaw rate transition function. Similarly, the another yaw rate transition function is obtained in advance by collecting data through experiment.

In sub-step 292, the processor 13 obtains a second estimated brake force based on the second target yaw rate and the real yaw rate using equation 4 as mentioned in sub-step 262. It should be noted that the second estimated brake force replaces the first estimated brake force, and the second target yaw rate replaces the first target yaw rate in equation 4. The replacement of variables in sub-steps of step 29 works in a similar manner and will not be repeated in the following.

In sub-step 293, the processor 13 obtains a second output brake force based on the second estimated brake force, the first gain, the normal force and the road frictional coefficient using equation 5 as mentioned in sub-step 263.

In sub-step 294, the processor 13 obtains a second output slip based on the second output brake force, the target slip coefficient, the second gain, the road frictional coefficient and the normal force using equation 6 as mentioned in sub-step 264.

In sub-step 295, the processor 13 selects the second target wheel based on the second target yaw rate and the real yaw rate according to Table 1 as mentioned in sub-step 265.

In sub-step 296, the processor 13 obtains the second control command corresponding to the second target wheel based on the second output slip using, for example, proportional-integral-derivative control.

In sub-step 297, the processor 13 outputs the second control command to, for example, a brake of the second target wheel for controlling the second target wheel.

In summary, according to the disclosure, the method for stabilizing movement of the vehicle and the vehicle stabilizing system utilize the processor 13 to determine whether the vehicle is driving on a dangerous path based on the set of vehicle data (i.e., to automatically perform risk assessment for the path), and when the processor 13 determines that the vehicle is driving on a dangerous path, the processor 13 obtains the compensation steering angle to assist the vehicle in steering, thereby deviating the vehicle from the dangerous path. In addition, the compensation steering angle may be obtained more accurately by considering various parameters (e.g., the collision risk assessment values and the parameters described in steps 241 and 242). Furthermore, the processor 13 selects the first target wheel based on the first target yaw rate and the real yaw rate according to different situations listed in Table 1, so that the processor 13 may control the vehicle more accurately.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method for stabilizing movement of a vehicle to be implemented by a processor, the vehicle including a plurality of wheels and an actuating unit which is a set of brakes respectively for the plurality of wheels of the vehicle, the processor being electrically connected to a controller that is configured to obtain, for the vehicle, an estimated lateral displacement, an estimated lateral speed, an estimated yaw angle error, an estimated yaw rate, and an estimated steering wheel angle, the method comprising steps of:

A) obtaining a set of vehicle data related to the vehicle;

B) determining whether a path on which the vehicle is driving is a dangerous path based on the set of vehicle data;

C) in response to determining that the path is a dangerous path, obtaining a compensation steering angle;

D) obtaining a target steering angle based on the estimated steering wheel angle and the compensation steering angle;

E) based on the target steering angle, selecting one of the plurality of wheels of the vehicle as a first target wheel and obtaining a first control command corresponding to the first target wheel; and F) outputting the first control command to the actuating unit to control one of the brakes that corresponds to the first target wheel based on the first control command, wherein the set of vehicle data includes a time to collision, a vehicle speed of the vehicle, a plurality of obstacle distances corresponding respectively to a plurality of directions relative to the vehicle, a vehicle weight of the vehicle, a first lateral stiffness of front wheels of the vehicle, a second lateral stiffness of rear wheels of the vehicle, a moment of inertia of the vehicle, a first distance between a front axle of the vehicle and a center of gravity of the vehicle, a second distance between a rear axle of the vehicle and the center of gravity of the vehicle, an actual longitudinal speed of the vehicle, an actual rate of change of lateral displacement of the vehicle, an actual rate of change of lateral speed of the vehicle, an actual yaw rate related to a yaw angle error of the vehicle, and an actual rate of change of yaw rate of the vehicle, wherein step B) includes sub-steps of obtaining a safety distance based on at least the time to collision and the vehicle speed included in the set of vehicle data, for each of the plurality of directions relative to the vehicle, obtaining a collision risk assessment value corresponding to the direction based on the safety distance and one of the plurality of obstacle distances that corresponds to the direction, and for one of the plurality of directions that corresponds to the path, determining whether the collision risk assessment value corresponding to the one of the plurality of directions is greater than a risk threshold value, so as to determine whether the path is a dangerous path, wherein step C) includes sub-steps of obtaining a calibrated lateral displacement, a calibrated lateral speed, a calibrated yaw angle error and a calibrated yaw rate based on the estimated lateral displacement, the estimated lateral speed, the estimated yaw angle error and the estimated yaw rate that are obtained from the controller, and the collision risk assessment values that correspond respectively to the plurality of directions relative to the vehicle, obtaining an expected rate of change of lateral displacement, an expected rate of change of lateral speed, an expected yaw rate related to a yaw angle error and an expected rate of change of yaw rate based on the vehicle weight, the first lateral stiffness, the second lateral stiffness, the moment of inertia, the first distance, the second distance, the actual longitudinal speed, the calibrated lateral displacement, the calibrated lateral speed, the calibrated yaw angle error, the calibrated yaw rate and the estimated steering wheel angle, and obtaining the compensation steering angle based on the expected rate of change of lateral displacement, the expected rate of change of lateral speed, the expected yaw rate related to a yaw angle error, the expected rate of change of yaw rate, the actual rate of change of lateral displacement, the actual rate of change of lateral speed, the actual yaw rate related to a yaw angle error and the actual rate of change of yaw rate.

2. The method as claimed in claim 1, wherein the set of vehicle data further includes an acceleration value of the vehicle and a performance weight value related to braking performance of the vehicle, and wherein in step B), the safety distance is obtained, using a safety-distance estimation model, based on the time to collision, the vehicle speed, the acceleration value and the performance weight value included in the set of vehicle data.

3. The method as claimed in claim 1, wherein in step C), the expected rate of change of lateral displacement ($\dot{y}$), the expected rate of change of lateral speed ($\dot{V}_y$), the expected yaw rate related to a yaw angle error ($\dot{\psi}$) and the expected rate of change of yaw rate ($\dot{r}$) are obtained based on the vehicle weight (m), the first lateral stiffness ($C_{\alpha f}$), the second lateral stiffness ($C_{\alpha r}$), the moment of inertia ($I_z$), the first distance (a), the second distance (b), the actual longitudinal speed ($V_x$), the calibrated lateral displacement (y), the calibrated lateral speed ($V_y$), the calibrated yaw angle error ($\psi$), the calibrated yaw rate (r) and the estimated steering wheel angle ($\delta_f$) using an equation provided below:

$$\begin{bmatrix} \dot{y} \\ \dot{V}_y \\ \dot{\psi} \\ \dot{r} \end{bmatrix} = \begin{bmatrix} 0 & 1 & V_x & 0 \\ 0 & \frac{-(C_{\alpha f}+C_{\alpha r})}{mV_x} & 0 & \frac{bC_{\alpha r}-aC_{\alpha f}}{mV_x} - V_x \\ 0 & 0 & 0 & 1 \\ 0 & \frac{bC_{\alpha r}-aC_{\alpha f}}{I_zV_x} & 0 & \frac{-(a^2C_{\alpha f}+b^2C_{\alpha r})}{I_zV_x} \end{bmatrix} \begin{bmatrix} y \\ V_y \\ \psi \\ r \end{bmatrix} + \begin{bmatrix} 0 \\ \frac{C_{\alpha f}}{m} \\ 0 \\ \frac{aC_{\alpha f}}{I_z} \end{bmatrix} \delta_f .$$

4. The method as claimed in claim 1, wherein the set of vehicle data includes a road frictional coefficient, an actual longitudinal speed of the vehicle, a real yaw rate of the vehicle, a first gain related to a frictional coefficient of the plurality of wheels of the vehicle, a target slip coefficient of the vehicle, a second gain related to the target slip coefficient of the vehicle and a normal force on the plurality of wheels of the vehicle, wherein step E) includes:

obtaining a target yaw rate based on the target steering angle and the actual longitudinal speed using a yaw rate transition function;

obtaining an estimated brake force based on the target yaw rate and the real yaw rate;

obtaining an output brake force based on the estimated brake force, the first gain, the normal force and the road frictional coefficient;

obtaining an output slip based on the output brake force, the target slip coefficient, the second gain, the road frictional coefficient and the normal force;

selecting the first target wheel based on the target yaw rate and the real yaw rate; and obtaining the first control command corresponding to the first target wheel based on the output slip using proportional-integral-derivative control.

5. The method as claimed in claim 4, wherein in step E), the estimated brake force ($\Delta F$) is obtained based on the target yaw rate ($r^*$) and the real yaw rate (r) using an equation provided below:

$$\Delta F(t) = K_p(r^* - r) + K_d\frac{d}{dt}(r^* - r) + K_I\int(r^* - r)dt.$$

6. The method as claimed in claim 4, wherein in step E), the output brake force ($\Delta F_{cmd}$) is obtained based on the estimated brake force ($\Delta F$), the first gain (A), the normal force ($F_Z$) and the road frictional coefficient ($\mu^*$) using an equation provided below:

$$\Delta F_{cmd} = \min(|\Delta F(t)|, A \times \mu^* \times F_Z).$$

7. The method as claimed in claim 4, wherein in step E), the output slip ($\lambda_{cmd}$) is obtained based on the output brake force ($\Delta F_{cmd}$), the target slip coefficient ($\lambda^*$), the second gain (B), the road frictional coefficient ($\mu^*$) and the normal force ($F_Z$) using an equation provided below:

$$\lambda_{cmd} = \min\left(\lambda^*, \frac{\lambda^*}{B}\ln\left(\frac{\mu^* \times F_Z}{\mu^* \times F_Z - \Delta F_{cmd}}\right)\right).$$

8. The method as claimed in claim 1, further comprising, after step B), steps of:

G) in response to determining that the path is not a dangerous path, determining whether a steering support service is required;

H) in response to determining that the steering support service is required, selecting one of the plurality of wheels of the vehicle as a second target wheel and obtaining a second control command corresponding to the second target wheel; and I) outputting the second control command for controlling the second target wheel.

9. The method as claimed in claim 8, wherein the set of vehicle data includes, for the vehicle, a steering wheel torque, an understeering determination result and an oversteering determination result, and wherein step G) includes:

determining whether the steering support service is required, which is determined by at least one of whether the steering wheel torque is greater than a torque threshold value, whether the understeering determination result indicates understeering, or whether the oversteering determination result indicates oversteering.

10. A system for stabilizing movement of a vehicle that includes a plurality of wheels and an actuating unit which is a set of brakes respectively for the plurality of wheels of the vehicle, the system comprising:

a processor configured to
  obtain a set of vehicle data related to the vehicle,
  determine whether a path in which the vehicle is driving on is a dangerous path based on the set of vehicle data,
  in response to determining that the path is a dangerous path, obtain a compensation steering angle,
  obtain a target steering angle based on an estimated steering wheel angle and the compensation steering angle,
  based on the target steering angle, select one of the plurality of wheels of the vehicle as a first target wheel and obtain a first control command corresponding to the first target wheel, and
  output the first control command to the actuating unit to control one of the brakes that corresponds to the first target wheel based on the first control command;

a vehicle sensing module configured to obtain a time to collision and a vehicle speed of the vehicle;

a road sensing module configured to obtain a plurality of obstacle distances corresponding respectively to a plurality of directions relative to the vehicle; and a controller electrically connected to said processor and configured to obtain, for the vehicle, an estimated lateral displacement, an estimated lateral speed, an estimated yaw angle error, an estimated yaw rate, and the estimated steering wheel angle, wherein the set of vehicle data includes the time to collision, the vehicle speed of the vehicle, the plurality of obstacle distances corresponding respectively to the plurality of directions relative to the vehicle, a vehicle weight of the vehicle, a first lateral stiffness of front wheels of the vehicle, a second lateral stiffness of rear wheels of the vehicle, a moment of inertia of the vehicle, a first distance between a front axle of the vehicle and a center of gravity of the vehicle, a second distance between a rear axle of the vehicle and the center of gravity of the vehicle, an actual longitudinal speed of the vehicle, an actual rate of change of lateral displacement of the vehicle, an actual rate of change of lateral speed of the vehicle, an actual yaw rate related to a yaw angle error of the vehicle, and an actual rate of change of yaw rate of the vehicle, and wherein said processor is further configured to
  obtain a safety distance based on at least the time to collision and the vehicle speed included in the set of vehicle data,
  for each of the plurality of directions relative to the vehicle, obtain a collision risk assessment value corresponding to the direction based on the safety distance and one of the plurality of obstacle distances that corresponds to the direction,
  for one of the plurality of directions that corresponds to the path, determine whether the collision risk assessment value corresponding to the one of the plurality of directions is greater than a risk threshold value, so as to determine whether the path is a dangerous path,
  obtain a calibrated lateral displacement, a calibrated lateral speed, a calibrated yaw angle error and a calibrated yaw rate based on the estimated lateral displacement, the estimated lateral speed, the estimated yaw angle error and the estimated yaw rate that are obtained from said controller, and the collision risk assessment values that correspond respectively to the plurality of directions relative to the vehicle,
  obtain an expected rate of change of lateral displacement, an expected rate of change of lateral speed, an expected yaw rate related to a yaw angle error and an expected rate of change of yaw rate based on the vehicle weight, the first lateral stiffness, the second lateral stiffness, the moment of inertia, the first distance, the second distance, the actual longitudinal speed, the calibrated lateral displacement, the calibrated lateral speed, the calibrated yaw angle error, the calibrated yaw rate and the estimated steering wheel angle, and
  obtain the compensation steering angle based on the expected rate of change of lateral displacement, the expected rate of change of lateral speed, the expected yaw rate related to a yaw angle error, the expected rate of change of yaw rate, the actual rate of change of lateral displacement, the actual rate of change of lateral speed, the actual yaw rate related to a yaw angle error and the actual rate of change of yaw rate.

11. The system as claimed in claim 10, further comprising a storage medium that is electrically connected to said processor and that stores a safety-distance estimation model, wherein the set of vehicle data further includes an acceleration value of the vehicle and a performance weight value related to braking performance of the vehicle, wherein said processor is configured to obtain the safety distance, using the safety-distance estimation model, based on the time to collision, the vehicle speed, the acceleration value and the performance weight value included in the set of vehicle data.

12. The system as claimed in claim 10, wherein the set of vehicle data includes a road frictional coefficient, an actual longitudinal speed of the vehicle, a real yaw rate of the vehicle, a first gain related to a frictional coefficient of the plurality of wheels of the vehicle, a target slip coefficient of the vehicle, a second gain related to the target slip coefficient of the vehicle and a normal force on the plurality of wheels of the vehicle, and wherein said processor is further configured to:

obtain a target yaw rate based on the target steering angle and the actual longitudinal speed using a yaw rate transition function;

obtain an estimated brake force based on the target yaw rate and the real yaw rate;

obtain an output brake force based on the estimated brake force, the first gain, the normal force and the road frictional coefficient;

obtain an output slip based on the output brake force, the target slip coefficient, the second gain, the road frictional coefficient and the normal force;

select the first target wheel based on the target yaw rate and the real yaw rate; and obtain the first control command corresponding to the first target wheel based on the output slip using proportional-integral-derivative control.

13. The system as claimed in claim 10, wherein said processor is further configured to:

in response to determining that the path is not a dangerous path, determine whether a steering support service is required;

in response to determining that the steering support service is required, select one of the plurality of wheels of the vehicle as a second target wheel and obtain a second control command corresponding to the second target wheel; and output the second control command for controlling the second target wheel.

14. The system as claimed in claim 13, wherein the set of vehicle data includes a steering wheel torque, an understeering determination result and an oversteering determination result, and wherein said processor is further configured to:

determine whether the steering support service is required, which is determined by at least one of whether the steering wheel torque is greater than a torque threshold value, whether the understeering determination result indicates understeering, or whether the oversteering determination result indicates oversteering.

* * * * *